US009928079B2

(12) United States Patent
Todd

(10) Patent No.: US 9,928,079 B2
(45) Date of Patent: Mar. 27, 2018

(54) CONDITIONAL PROCESSOR AUTO BOOT WITH NO BOOT LOADER WHEN COUPLED WITH A NONVOLATILE MEMORY

(71) Applicant: Dialog Semiconductor (UK) Ltd., Reading (GB)

(72) Inventor: Philip Todd, Corsham (GB)

(73) Assignee: Dialog Semiconductor (UK) Limited, Reading (GB)

( * ) Notice: Subject to any disclaimer, the term of this patent is extended or adjusted under 35 U.S.C. 154(b) by 130 days.

(21) Appl. No.: 14/493,410

(22) Filed: Sep. 23, 2014

(65) Prior Publication Data

US 2016/0085559 A1 Mar. 24, 2016

(51) Int. Cl.
  *G06F 9/44* (2006.01)
  *G06F 9/30* (2006.01)
  *G06F 1/32* (2006.01)

(52) U.S. Cl.
  CPC .......... *G06F 9/4403* (2013.01); *G06F 1/3234* (2013.01); *G06F 9/30* (2013.01)

(58) Field of Classification Search
  None
  See application file for complete search history.

(56) References Cited

U.S. PATENT DOCUMENTS

| | | | | |
|---|---|---|---|---|
| 3,744,034 A | * | 7/1973 | Paul | G06F 21/575 711/164 |
| 5,877,957 A | * | 3/1999 | Bennett | G05B 19/042 340/286.01 |
| 6,535,982 B1 | * | 3/2003 | Kawabe | G06F 9/30083 713/300 |
| 6,574,747 B2 | | 6/2003 | Ginsberg | |
| 6,823,435 B1 | | 11/2004 | Wisor | |
| 6,948,099 B1 | | 9/2005 | Tallam | |
| 6,968,469 B1 | * | 11/2005 | Fleischmann | G06F 1/3228 365/228 |
| 7,302,517 B2 | | 11/2007 | Lim et al. | |
| 7,308,567 B2 | | 12/2007 | Yamamoto et al. | |
| 7,318,173 B1 | | 1/2008 | Falik et al. | |
| 7,409,539 B2 | | 8/2008 | Amez et al. | |
| 7,683,660 B1 | * | 3/2010 | Bakker | G06F 17/5054 326/38 |
| 7,734,945 B1 | * | 6/2010 | Levidow | G06F 11/079 714/3 |

(Continued)

OTHER PUBLICATIONS

WikiBooks:A-Level Computing:Machine Code and Instruction Sets, May 29, 2013.*

*Primary Examiner* — Jaweed A Abbaszadeh
*Assistant Examiner* — Cheri Harrington
(74) *Attorney, Agent, or Firm* — Saile Ackerman LLC; Stephen B. Ackerman

(57) ABSTRACT

The use of a sleep, or halt, instruction enables a processor to halt execution when read from a non-volatile memory. The opcode for the sleep instruction is the same value as the constant bit value of an un-programmed, nonvolatile memory. When the opcode is read by the processor, execution is halted and the processor enters a wait or sleep mode. During the sleep mode, firmware is programmed into memory with another means such as an external host processor. When a valid trigger event occurs, for instance, external or internal interrupts or reset activation, the processor then exits the sleep mode and starts instruction etching at the PC_INIT address.

13 Claims, 2 Drawing Sheets

(56) References Cited

U.S. PATENT DOCUMENTS

| | | | |
|---|---|---|---|
| 2003/0156473 A1* | 8/2003 | Sinclair | G06F 9/4403 365/200 |
| 2004/0030870 A1* | 2/2004 | Buser | G06F 11/3648 712/227 |
| 2004/0098577 A1* | 5/2004 | Sane | G06F 9/30079 713/2 |
| 2004/0205755 A1* | 10/2004 | Lescouet | G06F 9/4843 718/100 |
| 2004/0230784 A1* | 11/2004 | Cohen | G06F 9/44521 713/1 |
| 2005/0005197 A1 | 1/2005 | Chong et al. | |
| 2008/0155542 A1* | 6/2008 | Maigne | G06F 9/4843 718/100 |
| 2009/0235125 A1 | 9/2009 | Lai | |
| 2010/0120529 A1* | 5/2010 | Shimabukuro | G06F 21/575 463/29 |
| 2011/0022826 A1* | 1/2011 | More | G06F 1/26 713/1 |
| 2011/0113227 A1 | 5/2011 | Lu et al. | |
| 2015/0127983 A1* | 5/2015 | Trobough | G06F 11/267 714/30 |

* cited by examiner

CONDITIONAL PROCESSOR AUTO BOOT WITH NO BOOT LOADER WHEN COUPLED WITH A NONVOLATILE MEMORY

TECHNICAL FIELD

The present disclosure is related to computer devices and more particularly is directed to the startup procedure of a microprocessor.

BACKGROUND

At a point when a processor has been powered up, or after a reset has been performed, the processor must be configured to execute a program. In order to accomplish this, a boot loader or a boot controller is required to setup a start address, a stack and other pointers to a SRAM as well as into local memory. If the system includes a read only memory (ROM) that has programmed boot information, then a boot controller is not required, but no changes to the boot sequence can be made without re-booting with a ROM that has been setup with the required changes.

If the system includes a non-volatile code memory, a boot controller is required to setup the starting points necessary to run the system boot and subsequent programs. In this situation there is no prior knowledge of the state of non-volatile memory, memory is assumed un programmed, and the processor must remain idle initially after power on. A boot controller is required to write a boot sequence into memory, then setup the start address and enable the processor.

US 2011/0113227 A1 (Lu et al.) is directed to a plurality of boot devices and basic input/output system, used for recording driving parameters of boot devices. US 2009/0235125 A1 (Lai) is directed to a booting system comprising a non-XIP memory for storing a plurality of booting images comprising a source image. US 2005/0005197 A1 (Chong et al.) is directed to a method for detecting bootable media independent of media partitioning. U.S. Pat. No. 7,409,539 B2 (Arnez et al.) is directed to a method and system for managing boot code in a computer system. U.S. Pat. No. 7,318,173 B1 (Falik et al.) is directed to a method for selecting one of a plurality of BIOS images included in a computer system. U.S. Pat. No. 7,308,567 B2 (Yamamoto et al.) is directed to a bootstrap program having a first error check code assigned and stored in a first storage device. U.S. Pat. No. 7,302,517 B2 (Lim et al.) is directed to controlling XIP in a serial flash memory. U.S. Pat. No. 6,948,099 B1 (Tallam) is directed to an operating system stored in a reprogrammable memory in which the memory may store a primary and recovery operating systems. U.S. Pat. No. 6,823,435 B1 (Wisor) is directed to a non-volatile memory system having a boot code section. U.S. Pat. No. 6,574,747 B2 (Ginsberg) is directed to a system implementing an XIP architecture comprising a plurality of XIP regions.

SUMMARY

It is an objective of the present disclosure that comprises a processor that includes an instruction (known as a SLEEP instruction herein) that stops code execution until an external event, or trigger, causes execution to continue.

It is further an objective of the present disclosure that the opcode for the SLEEP instruction has the same value as the memory, which is un programmed.

It is still further an objective of the present disclosure that the opcode value in the instruction set allows the processor to be enabled immediately and behave in a coherent manner whether the memory has been programmed with firmware, or not.

The present disclosure relates to a processor system that boots automatically from a preprogrammed non-volatile memory, or remains idle when memory is un programmed without the need for an additional boot loader, external control, or memory path intercept, such as a test bus. This reduces not only boot time, but also area needed to implement, complexity and cost of the system.

Nonvolatile memories, for instance EEPROM, FLASH and OTP, have a constant un-programmed bit value, frequently a logical '1'. A new processor instruction set defines a SLEEP, or halt processing, instruction opcode to be associated with the un-programmed bit value, thus the un-programmed memory looks like a long series of SLEEP instruction opcodes. Following power up and/or deactivation of a RESET signal, or other initial state triggers, the processor fetches the first instruction from a default address PC_INIT, alternatively from an address stored in a register PC_INIT. The next step will depend on the programmed state of the memory. If the memory is un-programmed, the fetched value is decoded into the SLEEP instruction. The processor will not attempt to read or execute any further instructions until a valid trigger event occurs. Valid trigger events can be internal or external interrupts, wakeup triggers, or a RESET activation, which would cause the instruction fetch to start again at the PC_INIT address. The processor may stall or enter a low power state while waiting.

BRIEF DESCRIPTION OF THE DRAWINGS

This invention will be described with reference to the accompanying drawings, wherein.

DETAILED DESCRIPTION

Figure 1:
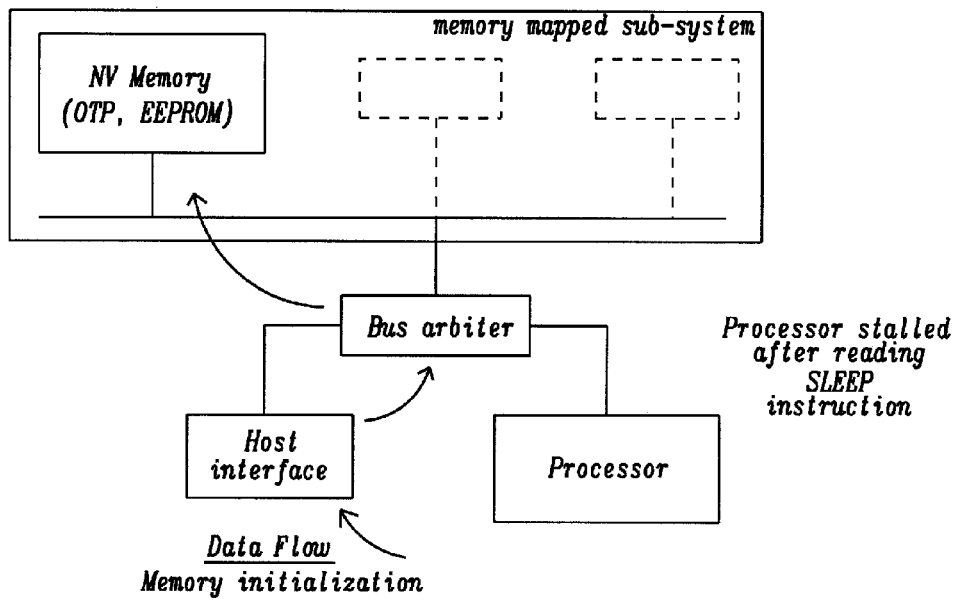
FIG. 1 is a processor system of the present disclosure before memory has been programmed.

In FIG. 1 is shown a processor system before the memory has been programmed. The processor will fetch a stored value in the un-programmed non-volatile (NV) memory. The fetched value is decoded to the SLEEP instruction. The processor will not attempt to read or execute any further instructions until a valid trigger event occurs. Valid trigger events comprise internal or external interrupts or wakeup triggers, or a RESET activation, which would cause the instruction fetch to start again at the PC_INIT address. As discussed previously the un-programmed memory is populated throughout with a logical value that is most likely a logical '1'. The processor upon reading the logical '1' enters a SLEEP mode. The processor is then stalled after reading the SLEEP instruction and may enter a low power state while waiting.

There are at least three subsequent actions that can be taken to continue to process information: 1) program firmware into memory with an entry point at the PC_INIT address and force a power cycle or a reset to trigger execution of the firmware; 2) download firmware into a different area of the memory map and change the processor address to point to the firmware entry point and trigger a wakeup event; and 3) leave the processor in the stalled state and control the system with for example an external host with access to the memory map.

With the processor halted in a sleep mode, memory initialization with program firmware and associated data is through a host interface and through the bus arbiter to the non-volatile NV memory. When this loading of firmware into memory is complete, a trigger event previously noted is performed to cause the processor to wake up from the SLEEP instruction and start processing the firmware that was loaded into memory.

Figure 2:
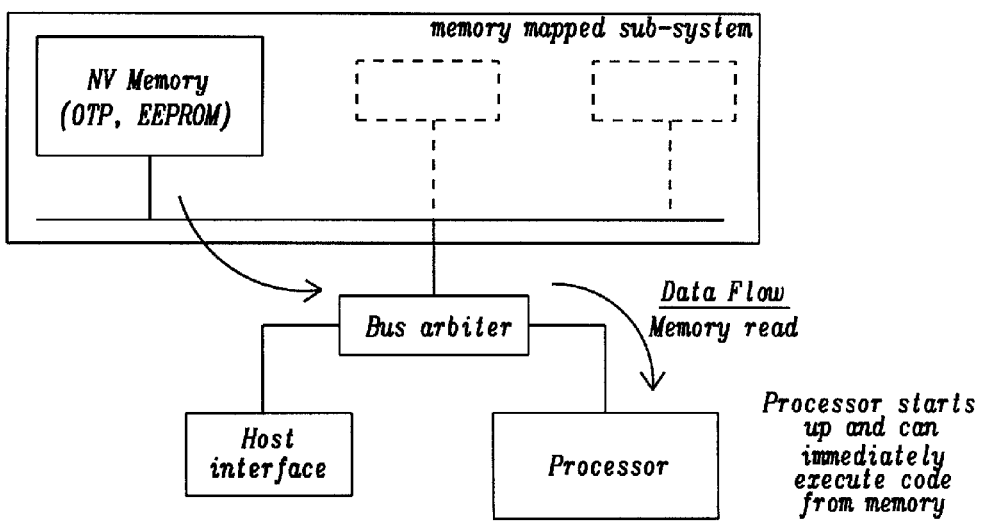
FIG. 2 is a processor system of the present disclosure after memory has been programmed.

In FIG. 2 is shown the processor system after the memory has been programmed and the processor has been awakened from the SLEEP instruction. When the processor is awakened, the processor can immediately execute code fetched from memory. The first fetched value is the first instruction of the firmware, which may itself be a boot program, or other initialization code. The processor will continue execution of this code directly from the programmed memory without the need of a boot controller. There is not any need for a boot loader or any other special support circuitry in the loading of the firmware into the non-volatile memory or the execution of firmware by the processor.

Figure 3:
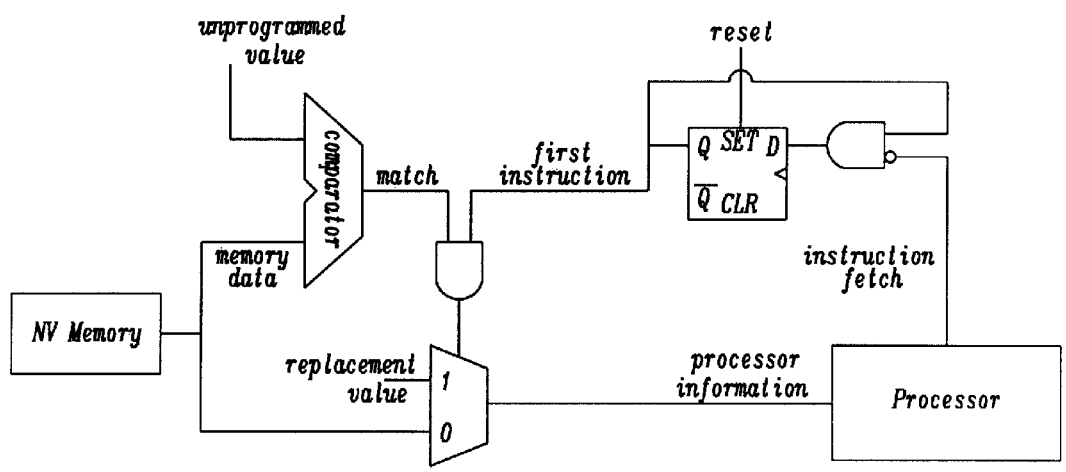
FIG. 3 is a circuit of the present disclosure that intercepts a first instruction fetched on exit from reset.

FIG. 3 shows a circuit of the present disclosure that intercepts a first instruction fetched on exit from reset and replacing it with a SLEEP instruction, if an un-programmed memory value is detected. The circuit is placed between the non-volatile memory and the processor and has a purpose to detect the un-programmed memory value, and then substitute the opcode with the SLEEP opcode before it is decoded by the processor.

After power up and/or deactivation of an initial state trigger, a reset signal for instance, the processor attempts to fetch its first instruction from a default address PC-INIT. A "first instruction" output register flag is also initialized to a logical "1" by the reset signal or initial state trigger. The intercept circuit captures the data returned from the memory and compares it to a constant value using a comparator. This constant is the known un-programmed value of the memory. If the constant value matches the data value read from memory, then a "match" flag is set to a logical "1". If "match" and the "first instruction" are both a logical "1", then a multiplexor selects a replacement value to be sent to the processor as the first instruction. This replacement value is the SLEEP instruction (or equivalent) for the processor. If "match" and "first instruction" are not both a logical "1", then the data value read from memory is allowed to pass through the multiplexor unmodified and is used as the first instruction. A "match" will be a logical "0" if the memory data is not the same as the constant value representing the un-programmed memory contents. The output of the "first instruction" register is gated with the instruction fetch signal to provide the next input to the register. The register is updated on the next rising clock edge, which happens at the end of the instruction fetch cycle. At the end of the first instruction fetch, the "first instruction" flag will be cleared to a logical "0". In this way "first instruction" is a logical "1" only during the first instruction fetch.

As an example, a processor may require each of the first N locations in memory to contain a branch instruction, one branch for each event handler, where the events may be reset, interrupts, exceptions etc. One of these locations will be read as the first instruction following reset. If the intercept circuit detects the un-programmed value of memory instead of a branch instruction, then a SLEEP instruction is inserted in its place.

A second example, a 32-bit processor might be designed such that a start pointer (the address of the program entry point) is expected to be stored at address 0x00000004, and this is the first location to be read from memory after reset. If the un-programmed memory bit value is '1', the processor will attempt to read the first instruction from address 0xFFFFFFFC, and the read value will be 0xFFFFFFFF. The value of either the first instruction address or the code stored at that address should be sufficient to indicate an un-programmed memory.

Other processors may require a more sophisticated mechanism to detect the un-programmed state, where the intercept is carried out over a number (M) instructions. To support this, the intercept circuit could replace the first M−1 instructions with NOP (no operation) instructions while capturing the values read from memory. On instruction M, if the set of M values matches a pre-determined set of criteria, a branch back to the start address is inserted at instruction M and the intercept circuit disabled. This adds an M instruction latency to the startup sequence, but is otherwise transparent to the processor. The match criteria is as simple as "not all bits the same value over M instructions", or a more specific sequence of expected values. If the match criteria is not met, then a SLEEP instruction is inserted at instruction M. Alternatively, a circuit could independently inspect the memory contents while preventing the processor from fetching instructions by holding the circuit in reset, gating the clock or by some other means. Once it has been established that the memory has been programmed then the processor may be started.

While the invention has been particularly shown and described with reference to preferred embodiments thereof, it will be understood by those skilled in the art that various changes in form and details may be made without departing from the spirit and scope of the invention.

What is claimed is:

1. A method to start a processor without requiring a boot controller, comprising:
   a) providing the processor configured to execute firmware instructions that it has fetched from a non-volatile memory and an instruction intercept circuit configured to detect an un-programmed non-volatile memory value and to substitute the un-programmed non-volatile memory value by a SLEEP opcode;
   b) fetching by the processor from the non-volatile memory a first instruction from a default address PC INIT or from an address stored in a register PC_INIT;
   c) checking, if the first instruction of the non-volatile memory is un-programmed or if it is programmed with firmware and, if the first instruction of the non-volatile memory is un-programmed, go to step d), else go to step f);
   d) substitute the first instruction by a sleep instruction and stopping code execution by the processor by the sleep instruction until a valid trigger event occurs;
   e) programming firmware into the memory with an entry point at the PC_INIT address or loading firmware and associated data into the non-volatile memory from a host interface with a firmware entry point while the processor has stopped execution and, when the loading of the firmware and of the associated data is complete the valid trigger event starts the firmware execution; and
   f) executing firmware code directly from the programmed memory without the need of a boot controller.

2. The method of claim 1, wherein the nonvolatile memory comprises EEPROM, FLASH, OTP or other types of non-volatile memories which have a known un-programmed or erased bit value.

3. The method of claim 1, wherein the valid trigger event comprises internal or external interrupts.

4. The method of claim 1, wherein the valid trigger event comprises wakeup triggers.

5. The method of claim 1, wherein the valid trigger event comprises RESET activation wherein the firmware entry point a PC_INITaddress, wherein the RESET activation is followed by forcing a power cycle and triggering execution of the firmware.

6. The method of claim 1, wherein the loading of the firmware is performed into an area of a memory map followed by adapting a program counter to point to the firmware entry point and triggering a wakeup event.

7. The method of claim 1, wherein after the valid trigger event the processor is left in the stalled state and the firmware processing is taken over by an external host with access to a memory map.

8. A computer system, comprising:
a) a processor connected to a bus arbiter, wherein the processor is configured to fetch a first instruction of a non-volatile memory and to check upon this value of the first instruction if the first instruction of the non-volatile memory is un-programmed and, if it so, to decode the fetched value to a SLEEP instruction, to enter a stalled state and to resume operation after a trigger indicates that a firmware has been loaded from a host interface into the non-volatile memory or, if the first instruction of the non-volatile memory is programmed with firmware, to execute the firmware directly from the programmed memory without the need of a boot controller;
b) said bus arbiter connected to the host interface and to the non-volatile memory;
c) said non-volatile memory;
d) an instruction intercept circuit placed between the non-volatile memory and the processor configured to detect the un-programmed memory value and then to substitute the un-programmed memory value with the SLEEP opcode before it is decoded by the processor; and
e) said host interface configured to load firmware via the bus arbiter to the non-volatile memory, hence programming the non-volatile memory while execution of said processor is halted.

9. The computer system of claim 8, wherein said processor reading of said un-programmed non-volatile memory occurs when the processor fetches its first instruction from a default address PC-INIT and if the memory is un-programmed, then a next instruction will be a SLEEP instruction read from the un-programmed non-volatile memory.

10. The computer system of claim 8, wherein said trigger event comprises internal or external interrupts, wakeup triggers, or a RESET activation, which would cause the instruction fetch to start again at the PC_INIT address.

11. The computer system of claim 8, wherein the firmware is a boot program or another initialization program.

12. The computer system of claim 8, wherein the processor is configured to perform said resumption of operation directly from programmed memory without the need of a boot controller.

13. The computer system of claim 8, wherein the instruction intercept circuit comprises:
a comparator having inputs and an output, wherein the comparator is configured to compare a first input comprising data captured from the non-volatile memory with a second input representing the known un-programmed value of the non-volatile memory and the output of the comparator is a first input to a logical AND gate indicating if there is a match between both inputs by a match flag;
said logical AND gate configured to set a first logical value if the match flag is set and a second input of the logical AND gate defining a first instruction flag have a same logical value, wherein an output of the logical AND gate is connected to a multiplexer; and
said multiplexer configured to provide a SLEEP instruction as a first instruction to the processor if the first logical value is set and to pass data read from the non-volatile memory unmodified to be used a first instruction if the first logical value is not set.

* * * * *